May 2, 1967 R. M. FOLDENAUER 3,316,829
STEAM COOKING APPARATUS
Filed Feb. 1, 1966 2 Sheets-Sheet 1
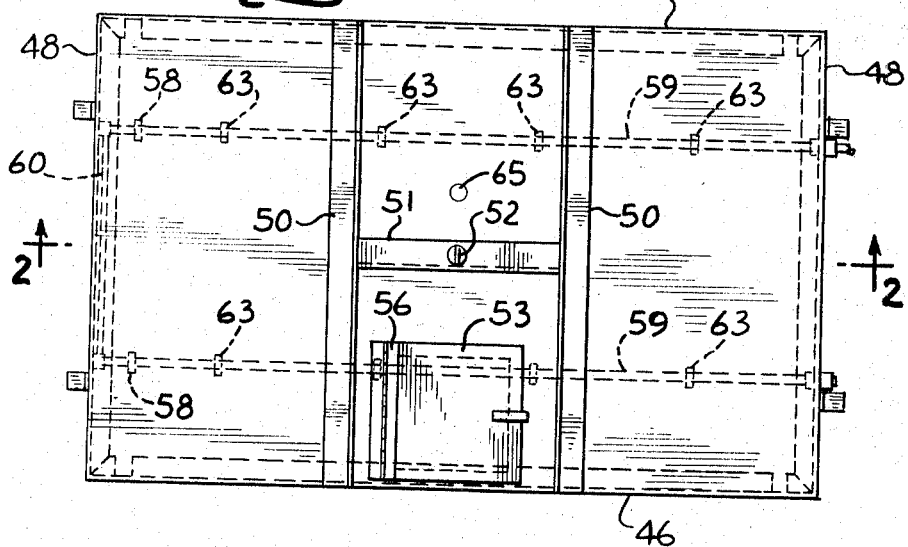
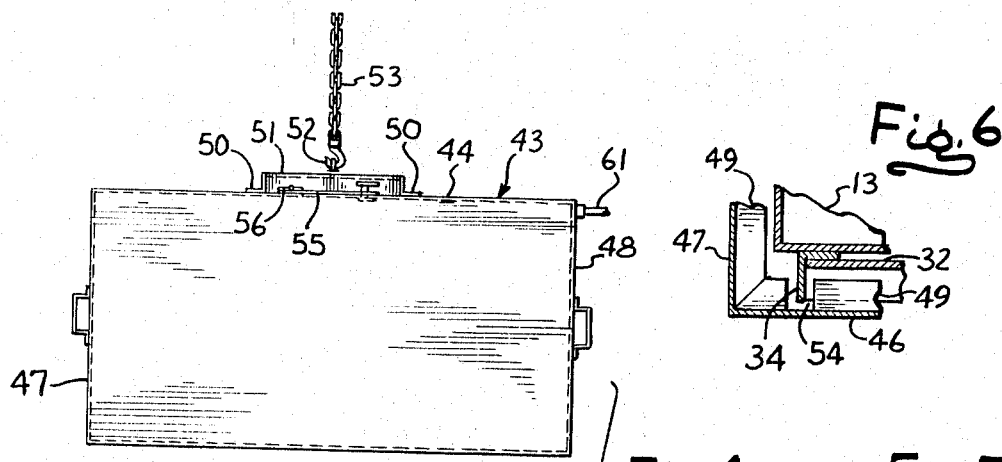
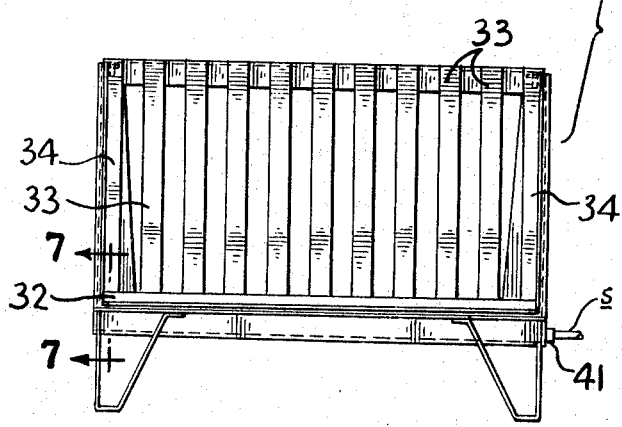
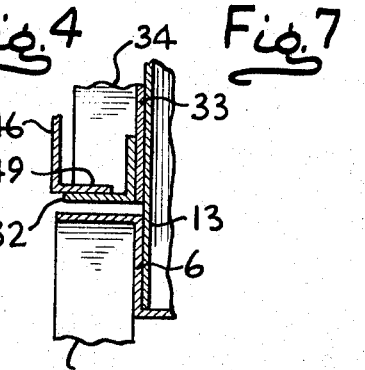
INVENTOR
RALPH M. FOLDENAUER
by: Spector & Alster ATTYS.

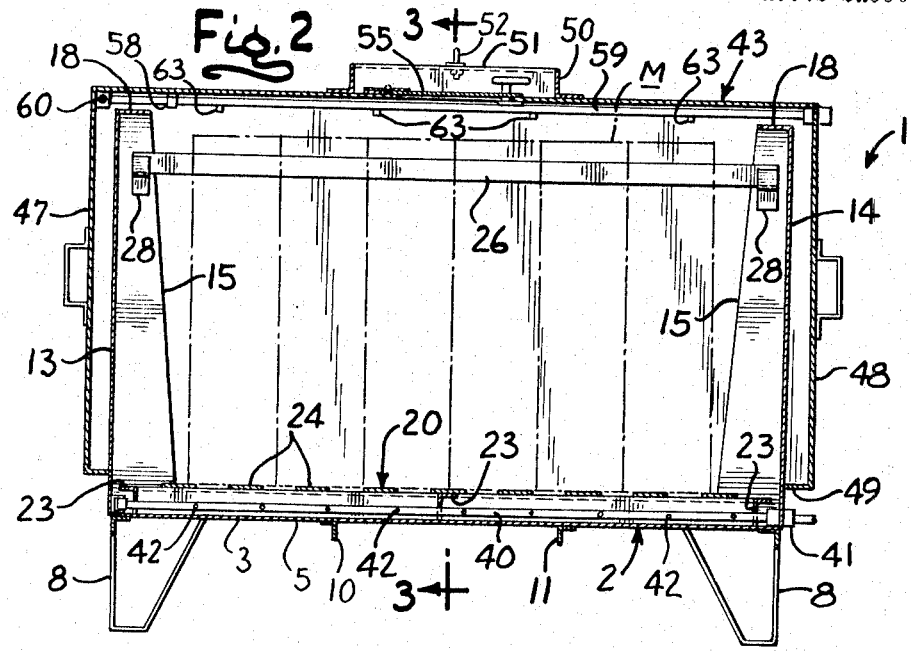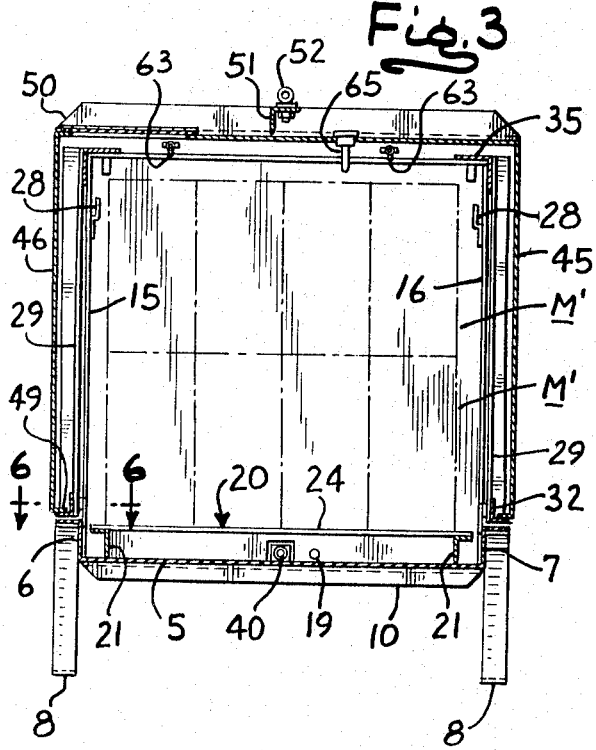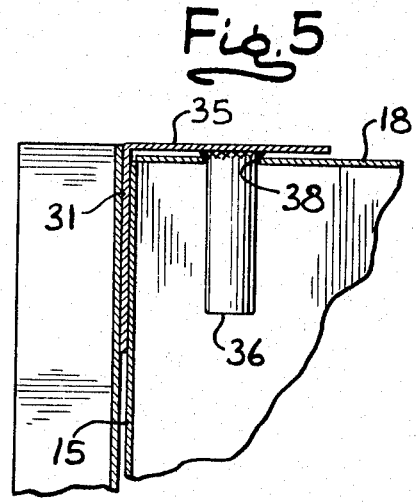

United States Patent Office 3,316,829
Patented May 2, 1967

3,316,829
STEAM COOKING APPARATUS
Ralph M. Foldenauer, Chicago, Ill., assignor to Bloomer-Fiske, Inc., a corporation of Illinois
Filed Feb. 1, 1966, Ser. No. 524,129
9 Claims. (Cl. 99—234)

This invention relates to improvements in steam cooking apparatus.

In the cooking of loaves of meat, fowl and the like, it has been the practice to place the uncooked product in molds which are stacked upon a truck or skid, whereupon the truck or skid is placed in a large steam oven to cook the product for a proper period of time. Thereafter, the loaded skid or truck is removed from the steam oven and placed in a location wherein the molds are allowed to cool. The foregoing procedure has utilized a fixed oven installation, which is relatively expensive, and thus adds to the cost of producing the product.

It is an object of the present invention to provide steam cooking apparatus which is of relatively inexpensive construction as compared to that of a steam oven. In accordance with the objects of the present invention, the truck upon which the molds are loaded, is equipped with a pipe through which steam may be supplied to heat the molds. A hood is provided for removable telescopic engagement with the truck to enclose the molds thereon and thereby form a steam chamber for the molds. The hood may be raised and lowered by a chain hoist or other suitable device. When the hood is in its raised position, the loaded truck may be wheeled or otherwise moved to a position below the hood, whereupon the hood may be lowered and the steam admitted into the steam chamber through the pipe in the truck to heat the molds. After completion of the cooking, the steam may be shut off, the hood raised out of the way and the truck removed. The hood is then available for use with another truck.

It is a further object of the present invention to provide apparatus of the type stated in which the hood is equipped with showering nozzles and piping to supply water to the nozzles so that after the steaming operation has been completed, the molds can be quickly chilled with cold water while the hood is still in lowered position over the molds.

The attainment of the above and further objects of the present invention will be apparent from the following specification taken in conjunction with the accompanying drawing forming a part thereof.

In the drawing:

FIG. 1 is a top plan view of a steam cooking apparatus constructed in accordance with and embodying the present invention;

FIG. 2 is a sectional view taken along line 2—2 of FIG. 1;

FIG. 3 is a sectional view taken along line 3—3 of FIG. 2 but showing a modified form of side members for the truck that forms part of the present invention;

FIG. 4 is a front elevational view of the apparatus with the hood shown in the raised position;

FIG. 5 is an enlarged fragmentary sectional view of a part of FIG. 3;

FIG. 6 is a fragmentary sectional view on an enlarged scale taken along line 6—6 of FIG. 3; and FIG. 7 is a fragmentary sectional view on an enlarged scale taken along line 7—7 of FIG. 4, but with the hood in lowered position.

Referring now in more detail and by reference characters to the drawing, which illustrates a preferred embodiment of the present invention, 1 designates a steam cooking apparatus comprising a truck 2 having a generally rectangular base 3. The base 3 comprises a bottom wall 5 which merges into longitudinally extending side members 6, 7. Welded or otherwise rigidly secured to the side members 6, 7 at the four corners of the base 3 are legs 8 by which the truck 2 is supported on a floor surface. The truck 2 is, in effect, a skid which may be moved about by a suitable lift truck. However, the legs 8 may be replaced by caster-mounted wheels so that the truck 2 may be moved about without the use of a lift truck. The base 3 may be reinforced by spaced transversely extending angles 10, 11 which are welded to the underside of the bottom wall 5.

Welded or otherwise rigidly secured to the ends of the base 3 are upstanding end walls 13, 14 which have side flanges 15, 16 at each edge thereof that extend for a short distance along the side members 6, 7. Each end wall 13, 14 also has a horizontal top flange 18 that extends between the two side flanges 15, 16. Each end wall 13, 14 may also have a drain hole 19 located about flush with the bottom wall 5.

A rack or false bottom 20 is removably mounted on the bottom wall 5. This rack 20 comprises longitudinally extending angles 21 and transversely extending angles 23, all of which support slats 24 upwardly from the bottom wall 5. The slats 24 constitute a shelf for supporting molds $m$ shown in broken lines in FIG. 2, or molds $m'$ shown in broken lines in FIG. 3. These molds may be of any suitable type in which the product is to be cooked.

To retain the molds $m$ or $m'$ on the shelf 24, removable side portions or retainers are provided. Where the molds are relatively long, for instance the mold $m$ of FIG. 2, the side portions may consist of longitudinally extending angles 26, one at each side of the truck. To support the angles 26, brackets 28 may be secured to the inside faces of the flanges 15, 16. Where smaller molds are used, for instance the molds $m'$ of FIG. 3, the side portions may consist of panels 29, 29. Each panel 29 comprises top angles 31, bottom angles 32 and upstanding angles 34 at the ends of the panels. Spaced parallel bars or slats 33 extend between the top and bottom angles 31, 32. The top angle 31 has a horizontal flange 35 that overlies the top flanges 18 of the two end walls 13, 14, and the flange 35 has pins 37 which project through holes 38 in the top flanges 18 so as to position the side panels 29, 29 substantially flush against the side flanges 15, 16 of the end walls 13, 14. The side panels 29, 29 are, furthermore, of such height that the bottom angles 32 thereof are very close to the side members 6, 7. The side panels 29, 29 are easily removed from the truck 2 by lifting them upwardly until the pins 19 are retracted from the holes 38.

Extending longitudinally and centrally of the truck base 3 between the bottom wall 5 and the shelf 24 is a pipe 40 that is secured in any suitable manner at the end walls 13, 14. This pipe 40 is capped at one end, and at its other end projects through the end wall 14, terminating in a fitting 41 by which the pipe 40 may be connected to a suitable steam line $s$. The pipe 40 has a number of orifices 42 along the length thereof to distribute the steam supplied to heat the molds.

Provided for cooperation with the truck 2 is a hood 43 that is sized for a removable telescopic engagement with the truck 2 to form a steam chamber for the molds. The hood 43 has a top wall 44, side walls 45, 46 and end walls 47, 48. An inwardly turned marginal flange 49 extends around the bottom of the side and end walls 45, 46 and 47, 48. When the hood is in lowered position on the truck 2, the flange 49 rests upon the side members 6, 7 or upon the bottom angles 32 if the side panels 29, 29 are used. The flange is notched at 54 to provide clearance for the side panel angles 34. Mounted on the top wall 44 are transverse angles 50, 50, which are cross connected by a short angle 51, the latter having an eyebolt 52 secured thereto. This eyebolt 52 is adapted to receive the hook of a chain 53 which forms part of a suitable lifting or hoisting device and by which the hood may be raised or lowered. Adjacent to one of the side walls 45, 46, the top wall 44 of the hood has a door 55 that is secured by a hinge 56. This door 55 permits access to one or more of the cooking molds therebelow during the cooking operation so that the temperature of the product put in the mold may be tested without having to elevate the hood.

Mounted on the underside of the top wall 44 are water pipes 59, 59 which are cross connected at one end by a length of pipe 60. The pipes 59, 59 may be secured to one end wall 48 and by strap hangers 58, 58. One of pipes 59, 59 may be capped while the other may be connected to a suitable source of cold water through a hose 61. At suitable length along the pipes 59, 59 are spray nozzles 63 for showering the molds with cold water after the steaming operation has been completed and before the hood is raised.

The top wall 44 may also have a hole for receiving a thermostat 65. This thermostat 65 may be connected in any known manner and through a suitable control system to the valve in the steam supply line *s* to open and close the same responsive to temperature changes within the steam chamber. This arrangement maintains a relatively constant temperature range within the steam chamber.

In use, the molds with the uncooked loaves are loaded onto the shelf 24 and the side panels 29 or angles 26, as the case may be, mounted in place on the truck. The truck is thereafter moved to its proper position below the raised hood 43. The steam line *s*, which may be flexible, is connected to the fitting 41 so that when the valve in the steam supply line is opened, steam may be supplied to the pipe 40. The hood 43 is then lowered to enclose the molds whereupon steam may be admitted into the pipe 40 so that the steam escapes from the pipe 40 into the chamber that houses the molds. If desired, from time to time, the door 55 may be opened to gain access to one of the molds so that a thermometer may be inserted into one of the molds at a place provided therefor in order to ascertain the temperature of the product.

After the cooking has been completed, the steam is shut off and cold water is admitted into the pipes 59, 59 so that sprays of water from the nozzles 63 cool the molds quickly. Thereafter, the water is turned off and the hood 43 is elevated by the lifting device so that the truck 2 may be moved to a storage location.

In compliance with the requirements of the patent statutes, there have been shown preferred embodiments of the present invention. What is considered new and sought to be secured by Letters Patent is:

1. Apparatus for heating molds comprising a transportable support member for the molds, said support member having a base with depending means for engagement with a floor surface or the like, said support member also being laterally open at two opposed side portions to facilitate loading and unloading of molds from the support, removable means at said two opposed side portions for maintaining the molds on the support when the latter is transported, a hood member sized for removable telescopic engagement with the support member and embracing said removable means and when so telescoped cooperating with the support member to form a chamber for the molds, and means on one of said members for delivering steam to the space enclosed by the two members for subjecting the molds to the heat from the steam.

2. Apparatus according to claim 1, further including means for raising and lowering the hood member into and out of telescopic engagement with the support member.

3. Apparatus according to claim 1 in which the means for delivering steam to said space comprises a pipe extending along said support member and wherein the hood member has means for showering the molds with coolant.

4. Apparatus according to claim 1, further comprising means on one of said members for showering the molds with coolant.

5. Apparatus according to claim 1 in which the hood has reclosable means for obtaining access to said chamber when the hood and support are telescoped.

6. In combination, a transportable support having a base portion with a bottom wall and depending means for engagement with a floor surface or the like, said base portion having a rack removably mounted above said bottom wall for supporting molds to be heated, means upwardly of said base portion for maintaining the molds on said rack when said support is transported, at least a portion of said means being removable to facilitate loading of the molds onto said rack and removal of the molds from said rack, a hood sized for telescopic engagement with said support and having means at which it may be engaged to raise and lower the hood into and out of telescoping engagement with said support and when telescoped with said support cooperates therewith to form a chamber for molds, conduit means extending above said bottom wall and having means for connection to a steam line for supplying steam to said chamber to heat said molds, and conduit means extending adjacent to the top of the hood and having spray nozzles in connection therewith for showering the molds with coolant after the steaming operation has been completed and before the hood is withdrawn from the support.

7. A combination according to claim 6 in which the hood has a door for access to the chamber.

8. In combination, a transportable support having a floor and side means above the floor for retaining objects on the support, a hood sized for removable telescopic engagement with the support and when so telescoped having side portions thereof embracing the side means of the support and cooperating with the support to form a chamber, means on said hood for connection to a device for raising and lowering the hood into and out of telescopic engagement with the support, reclosable means on the hood for obtaining access to the chamber, means for supplying steam to said chamber, and means independent of said steam supplying means for spraying cooling liquid in said chamber.

9. A combination according to claim 8 in which the side means are at least in part removable to facilitate loading and unloading objects onto said support.

References Cited by the Examiner

UNITED STATES PATENTS

| | | | |
|---|---|---|---|
| 637,662 | 11/1899 | Phenix | 126—369 |
| 1,007,999 | 11/1911 | White | 126—369 |
| 1,024,213 | 4/1912 | Long | 126—369 |
| 1,279,205 | 9/1918 | Wolff | 126—369 |
| 1,457,654 | 6/1923 | Daniel | 126—369 |
| 2,507,891 | 5/1950 | David | 126—369 |
| 2,574,950 | 11/1951 | Ben-Dor | 126—369 |

WALTER A. SCHEEL, *Primary Examiner.*

ROBERT W. JENKINS, *Examiner.*